United States Patent
Sonwane

(10) Patent No.: US 8,833,076 B2
(45) Date of Patent: Sep. 16, 2014

(54) THERMAL STORAGE SYSTEM

(75) Inventor: Chandrashekhar Sonwane, Canoga Park, CA (US)

(73) Assignee: Aerojet Rocketdyne of DE, Inc., Canoga Park, CA (US)

( * ) Notice: Subject to any disclaimer, the term of this patent is extended or adjusted under 35 U.S.C. 154(b) by 437 days.

(21) Appl. No.: 12/822,689

(22) Filed: Jun. 24, 2010

(65) Prior Publication Data

US 2011/0314812 A1 Dec. 29, 2011

(51) Int. Cl.
*B60K 16/00* (2006.01)
*F28D 20/00* (2006.01)

(52) U.S. Cl.
CPC .... *F28D 20/0034* (2013.01); *F28D 2020/0082* (2013.01); *F28D 2020/0047* (2013.01); *Y02E 60/142* (2013.01); *Y02E 10/46* (2013.01)
USPC .......................................... 60/641.8; 60/659

(58) Field of Classification Search
USPC ................ 60/645, 659, 641.1–641.15, 641.8; 126/641, 646, 617, 618, 619, 620, 642; 165/104.11, 10, 902, 6, 7; 422/46, 173, 422/175, 621, 646, 198; 210/167.06, 210/167.32, 175, 183; 392/441, 447; 219/208

See application file for complete search history.

(56) References Cited

U.S. PATENT DOCUMENTS

| | | | |
|---|---|---|---|
| 3,907,028 A | 9/1975 | Lawson | |
| 3,976,584 A * | 8/1976 | Leifer | 252/77 |
| 4,117,882 A * | 10/1978 | Shurcliff | 126/642 |
| 4,192,144 A * | 3/1980 | Pierce | 60/641.8 |
| 4,237,859 A * | 12/1980 | Goettl | 126/400 |
| 4,657,067 A * | 4/1987 | Rapp et al. | 165/10 |
| 4,719,969 A | 1/1988 | Patton et al. | |
| 5,568,835 A | 10/1996 | LaCount et al. | |
| 6,568,467 B1 | 5/2003 | Ohira et al. | |
| 6,712,069 B1 | 3/2004 | Spangler | |
| 6,761,041 B2 | 7/2004 | Roth et al. | |
| 7,171,994 B1 | 2/2007 | O'Brien | |
| 7,204,301 B2 | 4/2007 | Filippi et al. | |
| 7,441,558 B2 | 10/2008 | Leifer et al. | |
| 8,181,470 B2 * | 5/2012 | Narayanamurthy et al. | ... 62/113 |
| 8,282,017 B2 * | 10/2012 | Hawkins et al. | 237/2 A |
| 2005/0025471 A1 | 2/2005 | Ho | |
| 2008/0276616 A1 | 11/2008 | Flynn et al. | |
| 2008/0289793 A1 | 11/2008 | Geiken et al. | |
| 2009/0178668 A1* | 7/2009 | Boggavarapu | 126/601 |
| 2009/0301468 A1* | 12/2009 | Gray et al. | 126/640 |
| 2011/0108020 A1* | 5/2011 | McEnerney et al. | 126/640 |

FOREIGN PATENT DOCUMENTS

| | | |
|---|---|---|
| DE | 19752813 | 6/1999 |
| DE | 19825463 | 10/1999 |
| DE | 102005033682 | 5/2006 |
| EP | 1724415 | 11/2006 |

(Continued)

OTHER PUBLICATIONS

Extended European Search Report received Dec. 13, 2011.

*Primary Examiner* — Thomas Denion
*Assistant Examiner* — Kelsey Stanek
(74) *Attorney, Agent, or Firm* — Joel G. Landau

(57) ABSTRACT

A thermal storage system includes a first tank and a second tank thermally interfaced with the first tank. A pump is connected between the first tank and the second tank to move a fluid from the first tank to the second tank. A first heat exchanger includes a heat-exchanging portion that is located within the first tank. A second heat exchanger includes another heat-exchanging portion that is located within the second tank.

33 Claims, 3 Drawing Sheets

(56) References Cited

FOREIGN PATENT DOCUMENTS

| EP | 2072912 | 6/2009 |
| FR | 1147548 | 11/1957 |
| WO | 02079707 | 10/2002 |
| WO | 2009043786 | 4/2009 |

* cited by examiner

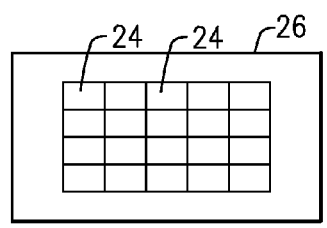
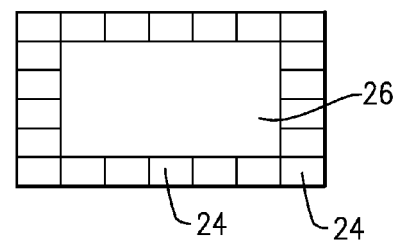
FIG.5  FIG.6
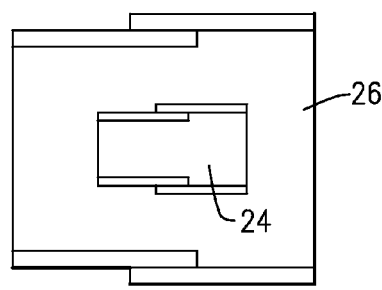
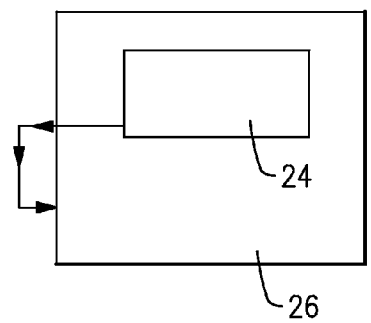
FIG.7  FIG.8

THERMAL STORAGE SYSTEM

BACKGROUND

This disclosure relates to thermal systems that utilize thermal storage fluids.

There are many different types of thermal systems that use a thermal storage fluid for storing thermal energy. As an example, solar power plants utilize a thermal storage fluid to capture solar energy for the purpose of generating electricity. A solar power plant may include a solar collector system that directs solar energy toward a central receiver. The solar energy heats a thermal storage fluid, such as a molten salt or phase change material, which circulates though the receiver. The heated thermal storage fluid may then be used to produce steam and drive a turbine to generate electricity. The thermal storage fluid may be stored or circulated through a series of tanks. Typically, some of the tanks store cool fluid and, when needed, provide the cool fluid to the receiver. Other tanks store heated fluid from the receiver, for producing the steam.

BRIEF DESCRIPTION OF THE DRAWINGS

The various features and advantages of the disclosed examples will become apparent to those skilled in the art from the following detailed description. The drawings that accompany the detailed description can be briefly described as follows.

FIG. 5 illustrates another example thermal storage system having multiple small tanks within a larger tank.

FIG. 6 illustrates another example thermal storage system having multiple small tanks arranged around a perimeter of a larger tank.

FIG. 7 illustrates another example thermal storage system having adjustable volume tanks.

FIG. 8 illustrates another example thermal storage system having a gravity pump.

DETAILED DESCRIPTION OF THE PREFERRED EMBODIMENT

Figure 1:
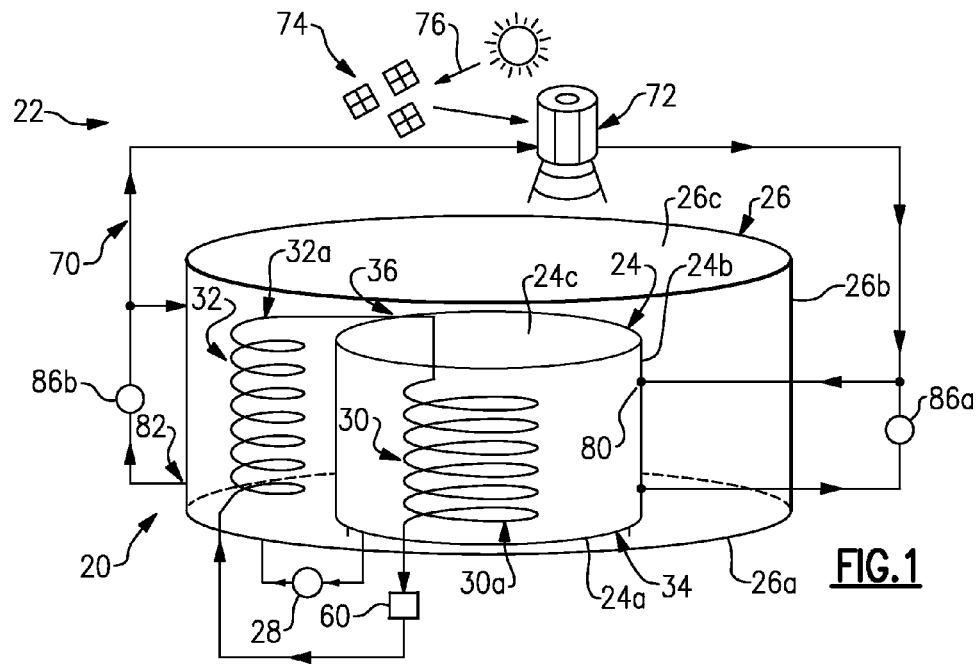
FIG. 1 illustrates an example thermal storage system within a solar power system.

FIG. 1 illustrates selected portions of an example thermal storage system 20 that may be used to handle a thermal storage fluid, such as a molten salt, in a thermally efficient manner. Although selected components of the thermal storage system 20 are shown in this example, it is to be understood that additional components may be utilized with the thermal storage system 20, depending on the particular implementation and needs of a system, for example.

As illustrated, the thermal storage system 20 is arranged within a solar power system 22, which will be described in more detail below. Alternatively, the thermal storage system 20 may be arranged within other types of systems, such as nuclear systems, electric arc furnace systems, or other thermal systems that utilize thermal storage fluid that would benefit from the disclosed examples.

The thermal storage system 20 includes a first tank 24 and a second tank 26 that is thermally interfaced with the first tank 24. For example, the tanks 24 and 26 share a common boundary or adjoining wall through which heat exchange occurs. The wall may be modified mechanically or chemically to enhance heat transfer from solid deposition, for example. In this case, the first tank 24 and the second tank 26 are generally hollow, and the first tank 24 is arranged at least substantially within the interior of the second tank 26. In the example, the first tank 24 is completely within the second tank 26. Alternatively, a portion of the first tank 24 may extend from the second tank 25.

Any "heat loss" (from a thermal storage fluid within the first tank 24) through the walls of the first tank 24 would be lost into the interior of the second tank 26. Rather than being dissipated to the ambient surroundings as might be the case with a single tank, the heat loss from the first tank 24 is absorbed by the thermal storage fluid in the second tank 26. Thus, the arrangement of the thermal storage system 20 facilitates achievement of enhanced thermal efficiency. Additionally, one or both of the tanks 24 and 26 may include high heat capacity members, such as capsules containing compressed gas or capsules made of ceramic material, to enhance the heat storing capacity of the thermal storage system 20.

In the illustrated example, each of the first tank 24 and the second tank 26 is generally cylindrical in shape. The cylindrical shape provides a relatively low surface area per volume to facilitate avoiding heat loss from the tanks 24 and 26. Alternatively, it is to be understood that other shapes may be selected for the tanks 24 and 26, such as but not limited to, square shapes or other geometric shapes.

The first tank 24 includes a floor 24*a*, sidewalls 24*b*, and a top 24*c*. Likewise, the second tank 26 includes a floor 26*a*, sidewalls 26*b*, and a top 26*c*. In some examples, the tops 24*c* and 26*c* may be separate and distinct pieces that enclose the interior volumes of the tanks 24 and 26. However, alternatively the tops 24*c* and 26*c* may actually be a single, common top that encloses the interior volumes of both tanks 24 and 26. That is, the top surfaces of the tanks 24 and 26 may be flush. Similarly, the floors 24*a* and 26*a* may be separate and distinct, or common.

In the thermal storage system 20, a pump 28 is connected between the first tank 24 and the second tank 26 to move the thermal storage fluid from the first tank 24 to the second tank 26. As shown, the pump 28 is exterior to the tanks 24 and 26. However, the pump 28 may alternatively be located within the interior of the second tank 26 or the first tank 24.

The thermal storage system 20 further includes a first heat exchanger 30 having a heat exchanging portion 30*a* within the first tank 24. A second heat exchanger 32 likewise includes a heat exchanging portion 32*a* that is within the second tank 26. As shown, the heat exchangers 30 and 32 are coil-type heat exchangers that are capable of circulating heat-exchanging fluids, such as water, carbon dioxide, combinations thereof, or other suitable fluids. Alternatively, other types of heat-exchangers may be used. In this case, the heat exchangers 30 and 32 are connected such that the heat-exchanging fluid flowing through the heat exchangers 30 and 32 flows through the second heat exchanger 32 in the second tank 26 and then to the first heat exchanger 30 in the first tank 24. Alternatively, the heat exchangers 30 and 32 are not connected such that heat-exchanging fluids flow independently through each.

In some examples, the first tank 24 may be mounted above the floor 26*a* of the second tank 26 such that there is a space 34 that spans between the floor 24*a* of the first tank 24 and the floor 26*a* of the second tank 26. The first tank 24 may include legs or other suitable hardware for mounting above the floor 26*a*.

Similarly, the top 24*c* of the first tank 24 may be below, or spaced from, the top 26*c* of the second tank 26 such that there is a space 36 between the tops 24c and 26c. A thermal storage of fluid may flow through the spaces 34 and 36, if the thermal storage system 20 is designed with such spaces 34 and 36. In some examples, providing one or both of the spaces 34 and 36 for the flow of the thermal storage fluid, rather than having the top 24c or bottom 24a of the first tank 24 exposed to the ambient surrounding environment, allows a greater degree of heat loss from the first tank 24 to be received into the thermal storage fluid in the second tank 26.

In the example illustrated, the second tank 26 may also experience heat loss to the surrounding ambient environment. Generally, the thermal storage fluid held within the interior of the second tank 26 loses more heat to the surrounding environment than is absorbed from the first tank 24. Therefore, the thermal storage fluid within the second tank 26 is normally cooler than the thermal storage fluid within the first tank 24.

The result of the difference in temperature between the thermal storage fluid in the second tank 26 and the thermal storage fluid in the first tank 24 is that the heat lost from the first tank 24 to the second tank 26 may be used to preheat the heat-exchanging fluid flowing through the second heat exchanger 32 before further heating the heat-exchanging fluid in the first tank 24. Thus, the heat is used more efficiently and the thermal storage system 20 may be made more compact than convention molten salt systems that utilize separate cold and hot molten salt tanks. The heat-exchanging fluid from the first heat exchanger 30 may then be provided to a component 60, such as a turbine of a generator or a Brayton cycle.

The thermal storage system 20 may also include an external fluid circuit 70 for moving the thermal storage fluid to and from the tanks 24 and 26. In this case, the external fluid circuit 70 forms a portion of the solar power system 22. The solar power system 22 also includes a solar receiver 72 connected within the external fluid circuit 70 and through which the thermal storage fluid can be circulated. Pumps or other control components may be incorporated, as is generally known. At least one solar collector 74 is operative to direct solar energy 76 toward the solar receiver 72 to heat the thermal storage fluid as it circulates through the solar receiver 72.

The external fluid circuit 70 is connected at an inlet 80 of the first tank 24 and at an outlet 82 of the second tank 26 to move the thermal storage fluid from the outlet 82 to the inlet 80. In this example, the tanks 24 and 26 also include respective circulation pumps 86a and 86b, which facilitate moving the thermal storage fluid within the tanks 24 and 26 to more uniformly distribute heat.

Figure 2:
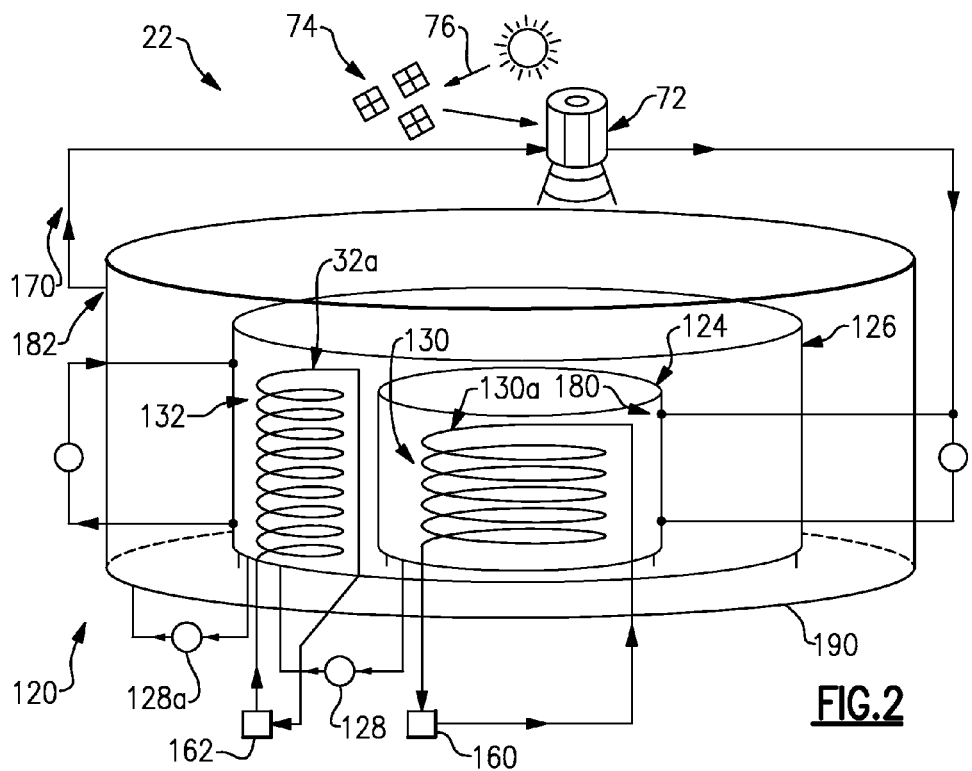
FIG. 2 illustrates another example thermal storage system.

FIG. 2 illustrates another example thermal storage system 120 that is somewhat similar to the thermal storage system 20 illustrated in FIG. 1. In this disclosure, like reference numerals designate like elements where appropriate, and reference numerals with the addition of one-hundred or multiples thereof designate modified elements that are understood to incorporate the same features and benefits of the corresponding original elements. In this case, the thermal storage system 120 additionally includes a third tank 190. The first tank 124 is at least substantially within the interior of the second tank 126, and the second tank 126 is at least substantially within the interior of the third tank 190. Thus, heat loss from the second tank 126 will be absorbed by the thermal storage fluid within the interior of the third tank 190. Thus, the arrangement of the thermal storage system 120 facilitates achievement of enhanced thermal efficiency.

An additional pump 128a is connected between the second tank 126 and the third tank 190 to move the thermal storage fluid from the second tank 126 to the third tank 190. Except for the pumps 128 and 128a, the interiors of the tanks 124, 126, and 190 are generally sealed from each other. In this case, the thermal storage fluid enters the thermal storage system 120 at the inlet 180 of the first tank 124. The thermal storage fluid may then move into the second tank 126 via the pump 128 and then into the third tank 190 via the pump 128a. The thermal storage fluid may then be received into the external fluid circuit 170 from the outlet 182 of the third tank 190.

The use of the third tank 190 provides the benefit of selectively superheating the heat-exchanging fluid that circulates through the heat exchangers 130 and 132 by making more efficient use of the heat in the system, as described above. In this case, superheating may be used with power cycles to generate electricity with improved efficiency.

Figure 3:
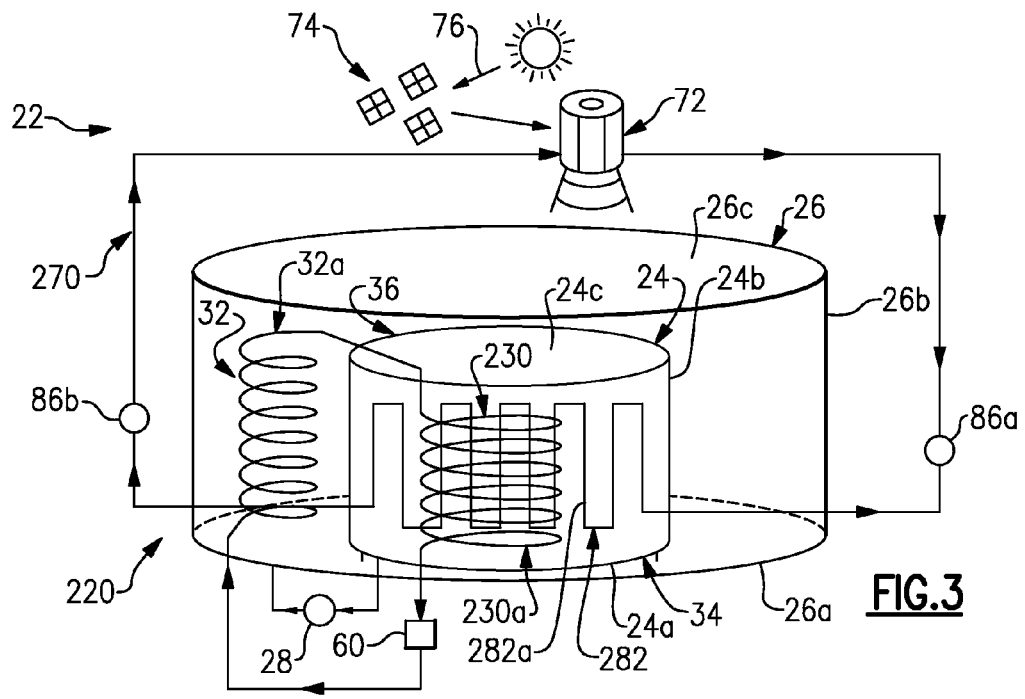
FIG. 3 illustrates another example thermal storage system that is configured for use with a phase change material.

FIG. 3 illustrates another example thermal storage system 220 that is a modification of the thermal storage system 20. In this example, the first tank 24 and the second tank 26 contain a phase change material as the thermal storage fluid. The phase change material circulates between the first tank 24 and the second tank 26. The phase change material is not limited to any particular type and may be, for example, a salt, a eutectic alloy, or an organic material. In this case, the external fluid circuit 270 connects to a heat exchanger 282 having a heat exchanging portion 282a within the first tank 24 to transfer heat from the solar receiver 72 to the phase change material.

The heat exchanger 230 and heat-exchanging portion 230a transfer heat from the phase change material to a heat-exchanging fluid, such as steam, carbon dioxide, or a carbon dioxide/steam mixture, which may drive component 60 (e.g., a turbine of a generator, Brayton cycle, etc.).

Figure 4:
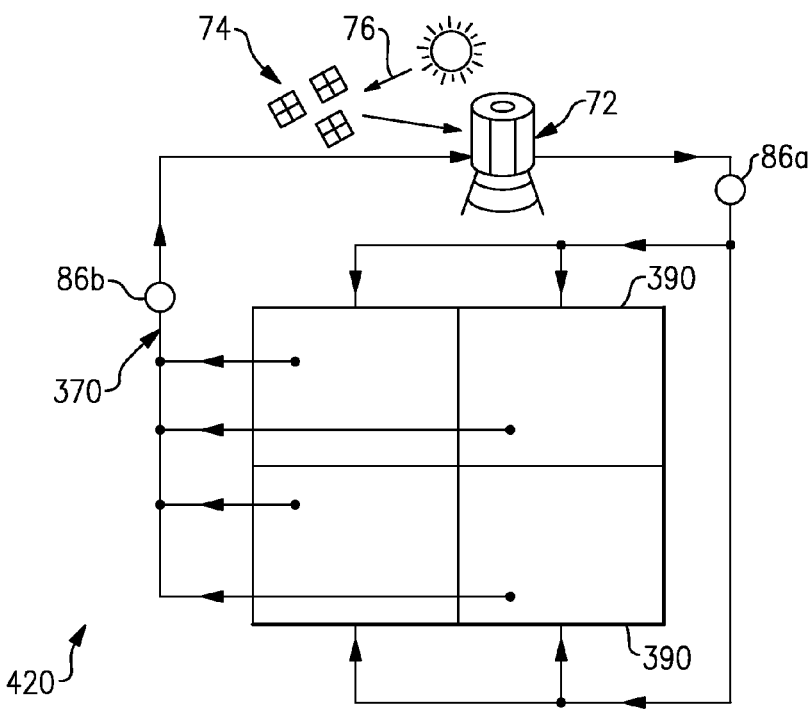
FIG. 4 illustrates another example thermal storage system that is configured with sets of tanks as modules.

In another example thermal storage system 420 illustrated in FIG. 4, the set of first and second tanks 24 and 26 (or 124 and 126) may be provided as a compact module 390 and used side-by-side or in a stacked configuration with one or more other compact modules 390 and external circuit 370. Although four modules 390 are shown, fewer or additional modules 390 may alternatively be used. The modules 390 provide the benefit of easier maintenance of an individual one of the modules 390 without having to shut down the entire thermal storage system 420. That is, each of the modules 390 can be isolated from the system, while maintaining operation of the system, for maintenance, cleaning, or the like. Additionally, use of relatively small modules compared to large, separate hot and cold tanks that are used in conventional systems, facilitates reduction of stagnant zones within the tanks 24 and 26, which improves the efficiency of the system.

FIGS. 5-9 illustrate additional example configurations for thermally interfacing the tanks 24 and 26. In the examples, the tanks 24 and 26 share a common wall or boundary that allows the tanks 24 and 26 to exchange heat. For clarity, the other components in the system, such as pumps (e.g., mechanical or gravity) connected between the tanks and heat exchangers as described herein, are not shown but may be similar to other disclosed examples. In FIG. 5, the thermal storage system includes multiple small tanks 24 that are stacked within the larger tank 26. The small tanks 24 each touch at least two other neighboring tanks 24 such that the tanks 24 are thermally interfaced with each other in addition to the larger tank 26. In FIG. 6, multiple small tanks 24 are arranged around the perimeter of the larger tank 26. Each of the tanks 24 touches two other neighboring tanks 24 as well as the larger tank 26.

In FIG. 7, the tanks 24 and 26 each have adjustable walls such that the volumes of the tanks 24 and 26 are adjustable. For instance, the volumes of the tanks 24 and 26 are adjusted in response to the heat-storing capacity that is needed at a particular time. As an example, more storing capacity is desired at night when energy consumption is low and less storing capacity is needed during the day when consumption is high.

In FIG. 8, the first tank 24 is arranged within the second tank 26 and is mounted near the top of the second tank 26 such that gravity serves as a pump to feed the thermal storage fluid from the first tank 24 to the second tank 26.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A thermal storage system comprising:
a first tank;
a second tank thermally interfaced with the first tank by a common wall between the first tank and the second tank;
a pump connected between the first tank and the second tank to move a fluid from the first tank to the second tank;
a first heat exchanger having a heat-exchanging portion within the first tank;
a second heat exchanger having a heat-exchanging portion within the second tank; and
a turbine connected with the first heat exchanger.

2. The thermal storage system as recited in claim 1, wherein the first tank is at least substantially within the second tank.

3. The thermal storage system as recited in claim 1, further comprising a third tank, wherein the first tank is at least substantially within the second tank, and the second tank is at least substantially within the third tank.

4. The thermal storage system as recited in claim 3, further comprising another pump connected between the second tank and the third tank to move the fluid from the second tank to the third tank.

5. The thermal storage system as recited in claim 1, wherein the first tank and the second tank are each cylindrical.

6. The thermal storage system as recited in claim 1, wherein the second tank includes at least a floor and sidewalls, and the first tank is mounted above the floor of the second tank such that there is a space between the floor and the first tank.

7. The thermal storage system as recited in claim 1, further comprising an external fluid circuit connected to an inlet of the first tank and an outlet of the second tank to circulate fluid received from the second tank into the first tank.

8. The thermal storage system as recited in claim 7, further comprising a solar receiver connected within the external fluid circuit and through which the fluid can be circulated, and at least one solar collector operative to direct solar energy toward the solar receiver to heat the fluid flowing therethrough.

9. The thermal storage system as recited in claim 1, wherein each of the first tank and the second tank includes a respective circulation pump.

10. The thermal storage system as recited in claim 1, wherein the second heat exchanger is fluidly connected to the first heat exchanger.

11. The thermal storage system as recited in claim 1, further comprising additional tanks that are thermally interfaced with the second tank, wherein the additional tanks are within the second tank.

12. The thermal storage system as recited in claim 1, further comprising additional tanks that are thermally interfaced with the second tank, wherein the additional tanks are arranged around the perimeter of the second tank.

13. The thermal storage system as recited in claim 1, wherein each of the first tank and the second tank have adjustable volumes.

14. A solar power system comprising:
a solar receiver through which a working fluid can be circulated;
at least one solar collector operative to direct solar energy toward the solar receiver to heat the working fluid; and
a thermal storage system fluidly connected with the solar receiver such that the working fluid can also be circulated through the thermal storage system, the thermal storage system including a first tank, a second tank thermally interfaced with the first tank by a common wall between the first tank and the second tank, a pump connected between the first tank and the second tank to move a fluid from the second tank to the first tank, a first heat exchanger having a heat-exchanging portion within the first tank, and a second heat exchanger having a heat-exchanging portion within the second tank.

15. The solar power system as recited in claim 14, further comprising a turbine connected with the first heat exchanger.

16. The solar power system as recited in claim 14, further comprising at least one additional thermal storage system arranged side-by-side with the thermal storage system.

17. A method for use with a thermal storage system that includes a first tank, a second tank thermally interfaced with the first tank, a pump connected between the first tank and the second tank to move a thermal storage fluid from the first tank to the second tank, a first heat exchanger having a heat-exchanging portion within the first tank, and a second heat exchanger having a heat-exchanging portion within the second tank, the method comprising:
circulating the thermal storage fluid through a solar receiver and at least one solar collector operative to direct solar energy toward the solar receiver to heat the thermal storage fluid;
moving the heated thermal storage fluid into the first tank and from the first tank to the second tank;
heating a heat-exchanging fluid within the heat-exchanging portion of the second heat exchanger using the heated thermal storage fluid within the second tank;
further heating the heat-exchanging fluid within the heat-exchanging portion of the first heat exchanger using the heated thermal storage fluid within the first tank.

18. The method as recited in claim 17, including driving a turbine using the heat-exchanging fluid.

19. The method as recited in claim 17, wherein the heated thermal storage fluid is a phase change material.

20. The method as recited in claim 17, wherein the heating of the thermal storage fluid includes heating using a second heat-exchanging fluid received from a solar receiver.

21. The thermal storage system as recited in claim 1, wherein the first tank and the second tank include a thermal storage fluid, and the thermal storage fluid is a molten salt.

22. The thermal storage system as recited in claim 1, wherein the first tank and the second tank include a thermal storage fluid, and the thermal storage fluid is a eutectic alloy.

23. The thermal storage system as recited in claim 6, wherein the first tank includes legs mounting the first tank above the floor of the second tank.

24. The thermal storage system as recited in claim 6, wherein the second tank includes a top and the first tank is mounted below the top such that there is a space between the top and the first tank.

25. The thermal storage system as recited in claim 1, wherein the second tank includes at least a floor, sidewalls and a top, and the first tank is mounted above the floor such that there is a space between the floor and the first tank and below the top such that there is a space between the top and the first tank.

26. The solar power system as recited in claim 14, wherein the first heat exchanger and the second heat exchanger are in a common closed loop.

27. The solar power system as recited in claim 14, wherein the first heat exchanger and the second heat exchanger are in independent closed loops.

28. The solar power system as recited in claim 14, wherein the first heat exchanger and the second heat exchanger contain another, different working fluid.

29. The solar power system as recited in claim 14, wherein the first heat exchanger and the second heat exchanger are closed loop.

30. The thermal storage system as recited in claim 1, wherein the first heat exchanger and the second heat exchanger are in a common closed loop.

31. The thermal storage system as recited in claim 1, wherein the first heat exchanger and the second heat exchanger are in independent closed loops.

32. The thermal storage system as recited in claim 1, wherein the first heat exchanger and the second heat exchanger contain another, different working fluid.

33. The thermal storage system as recited in claim 1, wherein the first heat exchanger and the second heat exchanger are closed loop.

\* \* \* \* \*